J. L. GARLINGTON.
Cotton-Planter.
No. 30,139. Patented Sept. 25, 1860.
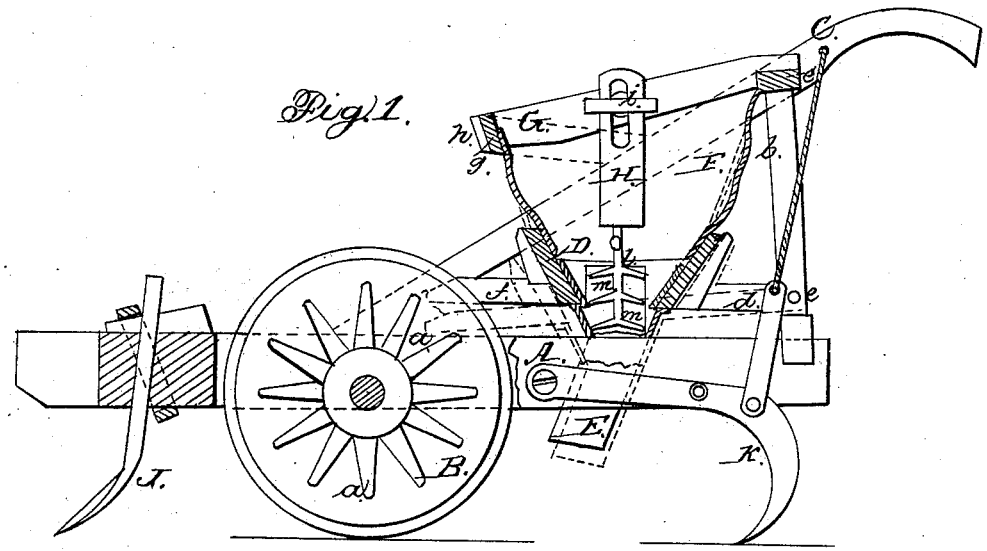
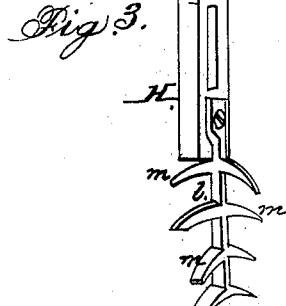
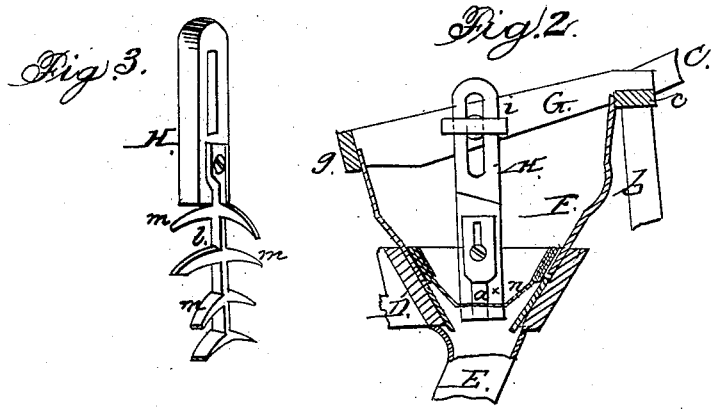
WITNESSES:
INVENTOR:

UNITED STATES PATENT OFFICE.

J. L. GARLINGTON, OF SNAPPING SHOALS, GEORGIA.

IMPROVEMENT IN SOWING-MACHINES.

Specification forming part of Letters Patent No. 30,139, dated September 25, 1860.

*To all whom it may concern:*

Be it known that I, J. L. GARLINGTON, of Snapping Shoals, in the county of Newton and State of Georgia, have invented a new and Improved Seeding-Machine; and I do hereby declare that the following is a full, clear, and exact description of the same, reference being had to the annexed drawings, making a part of this specification, in which—

Figure 1 is a side sectional view of my invention; Fig. 2, a detached sectional view of the hopper arranged for sowing small seeds and pulverulent manures; Fig. 3, a detached perspective view of the clearer.

Similar letters of reference indicate corresponding parts in the three figures.

The object of this invention is to obtain a simple and efficient machine for planting all kinds of seed, and also for sowing pulverulent manures.

There are some kinds of seed extremely difficult to plant with machines—such, for instance, as cotton-seed, beet-seed, &c., and also seeds which are naturally smooth, but are rendered adhesive by being rolled in moistened pulverulent manures previous to planting. By my invention these seeds may be planted equally as well as others; and it consists in the employment or use of a vibrating hopper in connection with a fixed bag and stationary standard provided with arms, or a supplemental bag, as hereinafter shown and described, whereby the desired end is attained.

To enable those skilled in the art to fully understand and construct my invention, I will proceed to describe it.

A represents a rectangular frame, in which a wheel, B, is placed, the wheel being provided with tappets $a$ at each side. On the back part of the frame A there are placed two uprights, $b\ b$, the upper ends of which are connected by a traverse-bar, $c$.

C C are handles attached to the frame A, and D is a hopper, the back part of which has bars $d\ d$ projecting from it, the ends of which are fitted by a rod or joint, $e$, which passes through the lower parts of the uprights $b\ b$, and bars $d\ d$ are allowed to work freely on the rod $e$. The front part of the hopper D has bars $f\ f$ projecting from it, and these bars rest on the tappets $a$ of the wheel B. The bottom of the hopper D is provided with a spout, E, and the upper part of the hopper is attached to the lower part of a bag, F, the upper end of which is secured to the traverse-bar $c$, handles C C, and a cross-bar, $g$, at the front ends of parallel bars $h$.

G is a bar which is attached to the traverse-bar $c$ and cross-bar $g$, at right angles thereto. This bar G extends centrally over the bag F and hopper D, and has a standard, H, attached to it by a set-screw, $i$.

To the front part of the frame A a furrow-share, $j$, is attached, and a covering-share, $k$, is placed at each side of the frame A at its back part.

When the implement is used for planting cotton-seed a rod, $l$, provided with lateral arms $m$, is attached vertically to the lower end of the standard H. The arms $m$ extend in pairs from opposite sides of the rod $l$, and the several pairs of arms have an oblique position relatively with each other, as shown in Fig. 3. The rod $l$ and arms $m$ extend down through the bottom of the hopper D, as shown clearly in Fig. 1. As the implement is drawn along, the tappets $a$, as the wheel B rotates, give a vibrating movement to hopper D, and the seed by this movement of the hopper, and the arms $m$ on rod $l$ cause the seed to be evenly distributed from the hopper without the possibility of the orifice of the latter choking or clogging. When small smooth seed are to planted, or pulverulent manures, the rod $l$ is detached and the lower end of a small bag, $n$, attached in its place. The upper end of bag $n$ is secured to a rectangular frame, $o$, which just fits in the upper part of the hopper D, and the lower part of the standard is perforated, as shown at $a^x$, to serve as a discharge-aperture. By this arrangement it will be seen that the bag $n$ vibrates with the hopper D, and the seed or manure will pass through the aperture $a^x$ of standard H.

If desired, two standards may be furnished with each machine, one having the rod $l$ and the other the bag $n$ attached.

I am aware that vibrating hoppers have been used in seeding-machines, and I am also aware that rods provided with arms have also been used as agitators to insure the escape of seed from the hopper; but, so far as I am aware, the agitators have all been arranged to vibrate and employed with a stationary hopper, thereby involving a more complex arrangement of parts. I do not claim, therefore, the employ ment or use of a vibrating hopper, nor a rod provided with arms to serve as an agitator; but—

I do claim as new and desire to secure by Letters Patent—

The vibrating hopper D, in connection with the fixed bag F and stationary standard H, provided either with the rod $l$, with arms $m$ attached, or provided with the supplemental bag $n$, as and for the purpose set forth.

J. L. GARLINGTON.

Witnesses:
    DAVID THOMPSON,
    J. O. SMITH.